Patented Aug. 4, 1953

2,647,853

UNITED STATES PATENT OFFICE 2,647,853

INJECTABLE SOLUTION OF SALT OF PARA-AMINOSALICYLIC ACID

Raymond Lardé and Maurice Pesez, Paris, France, assignors to Les Laboratoires Francais de Chimiotherapie, Paris, France, a French body corporate No Drawing. Application November 28, 1950, Serial No. 198,042. In France November 29, 1949

2 Claims. (Cl. 167—58)

It has been constantly observed that aqueous solutions of salts of para-aminosalicylic acid (PAS) turn brown in the course of preparation and storage, a phenomenon which is doubtless associated with a complex oxidation of the molecule. The change which takes place is a serious drawback, particularly as regards the therapeutic uses of para-aminosalicylic acid.

Applicants discovered that the sulphites and hydrosulphites of alkaline or alkaline earth metals, such as sodium sulphite and sodium hydrosulphite, alone or mixed, are eminently suitable for retarding the deterioration of PAS. It is found, for instance, that the addition of sulphites and hydrosulphites to aqueous solutions of the sodium salt of para-aminosalicylic acid prevents the appearance of brown discoloration, even after heating for several days at 60° C. The quantity ratio between the PAS and the reducing agent may vary within a considerable range. It depends on the use to which the product is to be put. In spite of the disappearance of a certain quantity of reducing agent used owing to the possible discoloration of a solution that has already turned brown and the presence of air in the solution of PAS, there should always be a slight excess of these substances in the final preparation. Nevertheless, experience shows that stabilizers, in particular sodium hydrosulphate, may be used greatly diluted. In most cases a concentration within the range of $10^{-3}$ or $10^{-4}$ sodium hydrosulphite appears sufficient to ensure the protection of the solutions. Hence the presence of stabilizing agents such as sodium sulphite or hydrosulphite does not alter the physiological properties of solutions of PAS.

There will be found below, by way of non-restrictive example, a method for preparing stabilized solutions of the sodium salt of para-aminosalicylic acid.

Example 0.2 g. neutral sodium sulphite and 30 g. sodium salt of para-aminosalicylic acid are dissolved in 95 cc. distilled water. The pH is adjusted to 7.6–7.8 by means of decinormal sodium hydroxide, then 25 mg. sodium hydrosulphite, dissolved in 5 cc. water, are added.

The solution thus prepared is placed in phials from which the air has previously been exhausted. The operations are carried out as rapidly as possible and preferably in a current of nitrogen.

The solutions obtained may be subjected to three tyndallizations at 60° C., then kept at the ordinary temperature without it being possible to observe any appreciable discoloration.

Having now described our invention, what we claim as new and desire to secure by Letters Patent is:

1. A process of preparing stable, injectable aqueous solutions of salts of p-amino salicylic acid, comprising dissolving a salt selected from the group consisting of an alkali metal sulfite and an alkaline earth metal sulfite, and a salt of p-amino salicylic acid in water, adding to said solution an alkali hydroxide solution to adjust its pH to 7.6–7.8, adding to said solution a salt selected from the group consisting of an alkali metal hydrosulfite and an alkaline earth metal hydrosulfite, the amounts of said sulfites and hydrosulfites present in said solution being such that the persistent excess thereof is at the most 0.75% by weight of the salt of p-amino salicylic acid dissolved in said solution, and storing said aqueous solution in evacuated sealed containers.

2. An injectable aqueous solution of a salt of p-amino salicylic acid comprising a substantial amount of a salt of p-amino salicylic acid, dissolved in water, a stabilizing agent selected from the group consisting of alkali metal and alkaline earth metal sulfites, and a stabilizing agent selected from the group consisting of alkali metal and alkaline earth metal hydrosulfites, said stabilizing agents being present in an amount not exceeding about 0.75% by weight of said salt of p-amino salicylic acid, said solution having a pH of about 7.6–7.8, and being free from discoloration and stable on prolonged storage and on heating to 60° C., said solution being stored in evacuated sealed containers.

RAYMOND LARDÉ.
MAURICE PESEZ.

References Cited in the file of this patent

UNITED STATES PATENTS

| Number | Name | Date |
|---|---|---|
| 2,041,436 | Schulemann | May 19, 1936 |
| 2,187,467 | Stuart | Jan. 16, 1940 |
| 2,540,785 | Hultquist | Feb. 6, 1951 |

OTHER REFERENCES

Oberweger-Pharmacy J., volume 163, page 36, July 1949.